UNITED STATES PATENT OFFICE.

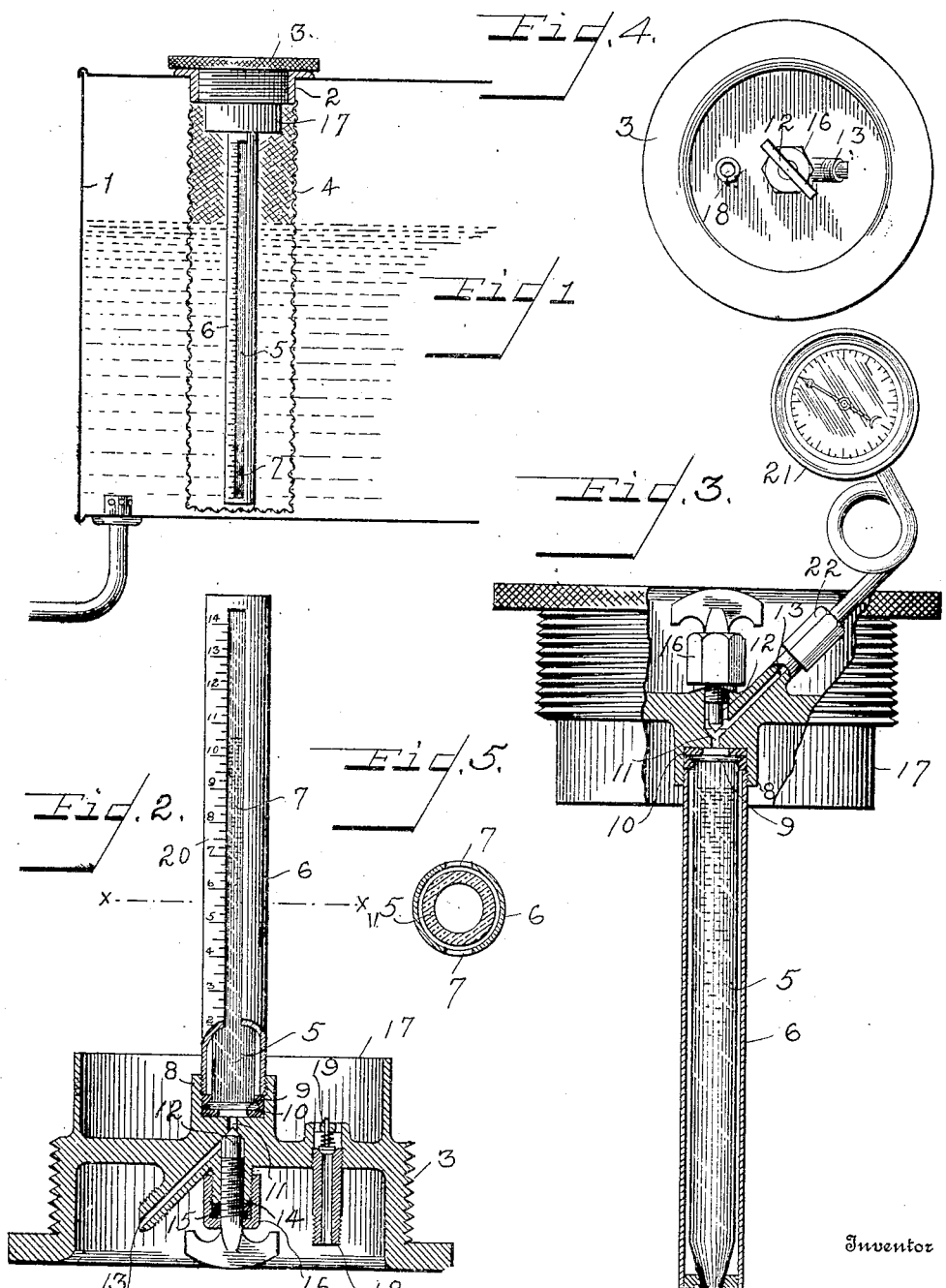

WILLIAM STANLEY WESTERMAN EDGAR, OF DAYTON, OHIO.

FLUID-GAGE.

1,158,907.  Specification of Letters Patent.  Patented Nov. 2, 1915.

Application filed September 19, 1910. Serial No. 582,683.

*To all whom it may concern:*

Be it known that I, WILLIAM STANLEY WESTERMAN EDGAR, a citizen of the United States, residing at Dayton, in the county of Montgomery and State of Ohio, have invented certain new and useful Improvements in Fluid-Gages, of which the following is a specification.

My invention relates to gages and particularly to fluid gages for determining the quantity of fluid contents of a tank or receptacle, and likewise the quality of the commodity by the determination of its relative weight.

The object of the invention is to simplify the structure as well as the means and mode of operation of such devices, whereby they will not only be cheapened in construction but will be more accurate and reliable in operation, convenient in form and location, easily operated and unlikely to get out of repair.

With the above primary and other incidental objects in view as will more fully appear in the specification, the invention consists of the features of construction, the parts and combinations thereof, and the mode of operation, or their equivalent, as hereinafter described and set forth in the claims.

Referring to the drawings, Figure 1 is a vertical sectional view of a tank showing the gage forming the subject matter hereof in its normal position. Fig. 2 is a vertical sectional view of the gage parts being in elevation removed from the tank and in position for determining the fluid contents of the tank. Fig. 3 is a part vertical sectional view of the gage as used in determining the relative weight of the commodity from which may be judged its quality. Fig. 4 is a top plan view of the gage. Fig. 5 is a transverse sectional view on line *x*—*x* of Fig. 2.

Like parts are indicated by similar characters of reference throughout the several views.

The gage herein shown and described is especially adapted for use in conjunction with the fuel tanks of automobiles, for determining the quantity and quality of the gasolene or other liquid fuel within the tank, but it is to be understood that it is not limited to such use, but may be used with any vessel or receptacle, for measuring liquids of any character.

In addition to its function of measuring the quantity and specific gravity of the contents of the tank, the gage herein described possesses several incidental features of advantage, such as furnishing a supplemental force feed for tanks of the gravity feed type, and providing means for readily clearing the supply conduit leading from the tank of deposit or obstructions. As is well known in order to have a free and even supply of liquid from a closed tank it is necessary to provide a vent or air inlet into the tank whereby air may enter to replace the liquid withdrawn, and also that a liquid evaporates in proportion to its exposed surface. The present device provides an adjustable closing for an air vent for the tank while limiting the exposed surface of the liquid to a minimum, thereby reducing the evaporation losses, which in the matter of volatile liquids such as gasolene and similar liquids is considerable. These incidental features will be more particularly pointed out hereinafter.

In the drawings 1 is a tank of ordinary construction, having an inlet surrounded by a flange 2, screw threaded or otherwise formed to receive a suitable closure, 3. In the drawing the cap or closure is shown as screw threaded, but it is to be understood that the form of fastening device is not essential, and that any other suitable fastener may be employed.

Carried on the flange 2 is the usual strainer or filter screen 4 as usually found in automobile fuel tanks.

Suspended from the under side of the closure 3 is a tubular member 5, preferably of glass, although not necessarily entirely of such material. Inclosing the tubular member 5 is a jacket 6 also carried on the closure 3, and having therein one or more vertical slots 7, said slots being preferably oppositely disposed as shown in Fig. 5. The connection of the tubular member 5 with the closure 3 is necessarily an air tight joint, and the preferable construction is as shown in Figs. 2 and 3 in which 8 is a projecting hub or sleeve screw threaded upon its interior. The tube 5 is preferably though not necessarily provided with a peripheral flange 9, slightly smaller than the interior of the hub or sleeve 8. A gasket 10 of suitable packing material is interposed between the tube 5 and the sleeve 8, against which the inner end of the jacket 6 is screwed thereby compressing the gasket and retaining the tube in place. It is obvious that other methods of attachment may be employed. Located in the closure 3 and registering with the bore of the tube 5 is a vent 11, controlled by the needle valve 12. From the vent 11 a conduit 13 leads normally to the atmosphere. The needle valve 12 is threaded into the sleeve 14 and is provided with packing 15 and an inclosing gland 16 in the usual manner. The upper side of the closure 3 is recessed and the operating handle of the needle valve, the conduit 13, and other parts are located within said recess below the level of the closure top in such position that they will not interfere with parts adjacent to the tank, but whereby the surface of the tank and closure will be substantially flush. It will be noted that the extremity of the angularly disposed conduit 13 is in a vertical plane, and that the orifice therein opens horizontally below the level of the closure, whereby the conduit is protected from the entrance of dirt or other foreign material.

Extending from the under side of the closure is a pendant flange 17 surrounding the tube 5 and jacket 6, and adapted to form a drip cup when the device is inverted as shown in Fig. 2.

Located in the closure 3 there is also an air inlet connection 18 adapted to be connected with an air pump or compressor of ordinary type. The air inlet connection is provided with a check valve 19 adapted to maintain the air pressure within the tank.

Operation: The usual condition of the tank and gage is as shown in Fig. 1, with the tank closed by the closure 3, and the pendant tubular member extending to a point adjacent to the bottom of the tank. The tube 5 is open at its lower extremity. Under normal conditions as when fluid is being supplied from the tank, the vent 11 is open through the withdrawal of the needle valve 12, and the tube communicates with the atmosphere through the vent 11 and conduit 13. Air is thus supplied to the tank to compensate for the liquid withdrawn, through the said conduit 13 and vent 11. There being but a limited area of liquid surface, equal only to the cross section of the tube 5, exposed to the atmosphere, the loss by evaporation even of a volatile fluid will be reduced to minimum. When the gage is in normal position with the vent 11 open, the liquid will rise within the tube to a level corresponding to that of the tank. If the valve 12 be then operated to close the vent 11, the liquid will be retained within the tube, and the gage may be removed from the tank for observation. The height of the column of liquid within the tube corresponds to the depth of the liquid in the tank.

Engraved upon the inclosing jacket 6 is a graduated scale 20, the graduations of which correspond to proportionate parts of the capacity of the tank. Thus if the tank had a capacity of fourteen gallons and the scale is divided into fourteen units, as shown in Fig. 2, each unit would correspond to one gallon of contents of the tank, and the height of the column of liquid in the tube compared with the scale would indicate the amount of liquid contained in the tank. The scale may be graduated in any desired units as gallons, quarts, liters, etc., and the scale may be graduated from either end, that is the zero point may be either adjacent to the lower end of the tube or adjacent to the closure 3. For convenience in handling the gage it is desirable to invert it and arrange the scale 20 to read from the closure 3 as shown in Fig. 2. In as much as more or less moisture will adhere to the gage and trickle down the tube and jacket during the reading of the gage, the flange 17 is provided which forms a drip cup in which the adhering liquid collects during the reading operation and from which it is returned to the tank upon the replacement of the gage and closure. In the case of many liquids the quality varies with the specific gravity, and in many cases it is possible to determine the grade or purity of the commodity by the relative weight of a given body of the fluid. This is particularly true of certain gaseous or volatile liquids of which gasolene is one. Next in importance to knowing the available supply of fuel, as determined by means of the herein described gage, a knowledge of the grade or purity of the fuel supply is desirable to the automobilist.

The grade or purity may be approximately determined by ascertaining the weight or pull of a predetermined quantity of the fluid within the tube 5 upon a vacuum gage 21 attached to the conduit 13 as shown in Fig. 3. The vacuum gage 21 may be of any suitable type, the particular construction thereof forming no part of the present invention. The gage being in place in the tank, the conduit 13 being open, that is the vacuum gage not being connected, the needle valve 12 is opened allowing the fluid to rise within the tube 5 to fill the tube. The gage is then removed from the tank and if more than the required amount of fluid is found in the tube, the needle valve 12 is slightly opened to admit a limited amount of air which permits the fluid to escape from the tube until the top of the column of fluid stands at a predetermined point. Thus an equal amount of fluid will be employed at each operation. When the proper quantity of fluid has been secured within the tube, which is an arbitrary amount previously determined in accordance with the marking of the vacuum gage scale, the vacuum gage 21 is attached to the conduit 13 by means of the union 22, and the needle valve is opened, thereby permitting the gage to communicate with the interior of the tube 5. The weight of the column of fluid within the tube will exert a pull or suction upon the vacuum gage 21 which will be indicated thereby. A comparison of the vacuum gage indication with a predetermined standard will determine approximately the grade or purity of the commodity. It is to be understood that the gage is not designed as an accurate scientific instrument, but that the results will be only approximately correct, sufficiently close for the practical purposes of an automobile driver who must purchase fuel of an unknown quality.

If the tank is full of liquid it will be an easy matter to fill the tube 5 with the liquid to or above the proper point by merely opening the vent 11 as before mentioned, when the liquid will rise within the tube to the level of that of the tank. However if only a limited amount of liquid is contained in the tank, the level of which is below the proper point, means must be provided for causing the level of the liquid to rise in the tube above that of the tank. This is the primary object of the air inlet connection 18. The connection 18 is screw threaded to receive the connection of a hand pump or other air compressor such as used to inflate the automobile tires. By means of such a pump or compressor the pressure of the air within the tank upon the liquid contents thereof is increased causing the column of liquid to rise within the tube 5 to or above the desired point. It is to be understood that the vent 11 and conduit 13 are open during such operation. When the column of liquid in the tube has been raised to or above the desired point by the compression of the air in the tank, the vent 11 is closed and the gage is removed from the tank. If the tube is found to contain more than the required quantity, the vent 11 is slightly opened permitting the escape of liquid until the top of the column stands at the predetermined point as before described, when the vacuum gage 21 is attached to the conduit 13, the vent 11 opened and the reading taken as before mentioned. By this means even a very limited amount of liquid may be tested.

It will thus be seen that the device may be employed first to determine the quantity of liquid in the tank, and by the attachment of the vacuum gage 21 may be employed to determine the quality of the liquid or the relative grade thereof.

In addition to the aforedescribed function of the air connection 18, several incidental advantages result from its use. In the usual gravity feed type of fuel tanks difficulty is frequently experienced in utilizing the last of the fuel supply, after the fluid level has fallen so low that there is not sufficient head to carry an ample supply of the liquid through the service pipe. Under such conditions a supplemental forced feed may be provided by closing the vent 11 by means of the needle valve 12, and increasing the air pressure within the tank upon the remaining liquid supply by means of a pump or compressor attached to the valved inlet 18.

A further advantage of the construction is that of clearing the service pipe which is frequently obstructed by a deposit of oils, gums, or dirt carried by the gasolene or other liquid fuel.

By closing the vent 11, and operating a pump or compressor attached to the valved inlet 18, the air pressure within the tank may be increased, after which the service pipe may be opened at the carbureter, and the obstructions blown out of the pipe.

It is to be understood that the tank is first emptied of its liquid contents.

From the above description it will be apparent that there is thus produced a measuring device or gage possessing the particular features of advantage before enumerated as desirable, but which obviously is susceptible of modification in its form, proportions, details of construction, and arrangement of parts without departing from the principle involved or sacrificing any of its advantages.

Having thus described my invention I claim:

1. A measuring pipette, and a drip chamber carried by and surrounding the lower end of the pipette when the pipette is held in measuring position.

2. In a device of the character described, a vessel closure recessed upon its opposite sides, a measuring pipette projecting from within the recess in the inner side of the closure, and a control valve for the said pipette located in the outer recess of the closure.

3. A measuring pipette, a drip chamber inclosing the lower end of the pipette when held in measuring position, said drip chamber being adapted upon inversion of the pipette to form a closure for a vessel within which the pipette will project.

In testimony whereof, I have hereunto set my hand this 17th day of September, 1910.

W. S. WESTERMAN EDGAR.

Witnesses:
REUBEN R. HOLMES,
F. L. WALKER.